US008997966B2

(12) United States Patent
Yamada

(10) Patent No.: US 8,997,966 B2
(45) Date of Patent: Apr. 7, 2015

(54) SLIDING PARKING SWITCH

(71) Applicant: Honda Motor Co., Ltd., Tokyo (JP)

(72) Inventor: Hajime Yamada, Ranchos Palos Verdes, CA (US)

(73) Assignee: Honda Motor Co., Ltd., Tokyo (JP)

(*) Notice: Subject to any disclaimer, the term of this patent is extended or adjusted under 35 U.S.C. 154(b) by 167 days.

(21) Appl. No.: 13/670,595

(22) Filed: Nov. 7, 2012

(65) Prior Publication Data
US 2014/0123803 A1 May 8, 2014

(51) Int. Cl.
B60W 10/18 (2012.01)
F16H 59/02 (2006.01)
G05G 1/02 (2006.01)

(52) U.S. Cl.
CPC ............... F16H 59/02 (2013.01); G05G 1/025 (2013.01); G05G 1/02 (2013.01)

(58) Field of Classification Search
USPC ............ 192/220, 219.4, 219, 220.2, 220.3; 74/473.12, 473.14, 473.25, 473.3, 74/473.33, 473.1, 473.21, 473.22, 473.23, 74/473.24, 473.26, 473.31, 527, 519, 532
See application file for complete search history.

(56) References Cited

U.S. PATENT DOCUMENTS

| 2,293,698 | A |   | 8/1942  | Chaput |
|-----------|---|---|---------|--------|
| 3,621,956 | A |   | 11/1971 | Suckow et al. |
| 3,967,709 | A |   | 7/1976  | Cole et al. |
| 4,246,989 | A |   | 1/1981  | Kohler |
| 4,462,487 | A |   | 7/1984  | Warwick et al. |
| 4,513,276 | A | * | 4/1985  | Kubota et al. ............ 200/61.88 |
| 4,565,151 | A | * | 1/1986  | Buma ...................... 116/28.1 |
| 4,875,563 | A |   | 10/1989 | Larson et al. |
| 5,127,245 | A | * | 7/1992  | Imai et al. ................... 70/247 |
| 5,402,870 | A | * | 4/1995  | Osborn .................... 192/220.7 |
| 5,540,180 | A | * | 7/1996  | Kataumi et al. ........... 116/28.1 |
| 5,694,113 | A |   | 12/1997 | Chen |
| 5,706,703 | A |   | 1/1998  | Kim |
| 6,092,435 | A | * | 7/2000  | Paparoni ................ 74/473.25 |
| 6,301,994 | B1| * | 10/2001 | Syamoto .................... 74/538 |
| 6,938,509 | B2|   | 9/2005  | Bulgrien |
| 7,213,483 | B2| * | 5/2007  | Inoguchi et al. ......... 74/473.23 |
| 7,322,457 | B2|   | 1/2008  | Giefer et al. |
| 7,779,715 | B2| * | 8/2010  | Mitteer .................. 74/473.23 |
| 2012/0006634 | A1 |   | 1/2012 | Bensch et al. |

* cited by examiner

Primary Examiner — Saul Rodriguez
Assistant Examiner — David J Hlavka
(74) Attorney, Agent, or Firm — Rankin, Hill & Clark LLP

(57) ABSTRACT

A sliding parking switch assembly and method for a vehicle includes a transmission operating mode selector for an automatic transmission moveable between a park position and a drive position and a parking switch slidably moveable between a parking brake engaged position and a parking brake disengaged position. The parking switch blocks movement of the transmission operating mode selector from the park position to the drive position when the parking switch is in the parking brake engaged position.

22 Claims, 6 Drawing Sheets

US 8,997,966 B2

SLIDING PARKING SWITCH

BACKGROUND

Parking and/or emergency brakes on vehicles have typically been associated with a lever located below the steering column and/or dashboard or located within a center console area of the vehicle. To activate the brake, a driver would depress the lever when located below the steering column and dashboard, or would pull up on the lever when located within the center console, until it locks the brake. To avoid driving with the brake in an "on" state, a warning symbol or indicator is typically displayed if the driver drives with the brake in the "on" state. Oftentimes, however, the driver could still drive with the brake on and may do so if the driver does not pay attention to the warning symbol or indicator.

SUMMARY

According to one aspect, a sliding parking switch assembly for a vehicle includes a transmission operating mode selector for an automatic transmission moveable between a park position and a drive position and a parking switch slidably moveable between a parking brake engaged position and a parking brake disengaged position. The parking switch blocks movement of the transmission operating mode selector from the park position to the drive position when the parking switch is in the parking brake engaged position.

According to another aspect, a vehicle parking switch includes a parking switch body slidably moveable between a parking brake engaged position wherein a parking brake is in an engaged state and a parking brake engaged position wherein the parking brake is in a disengaged state. The parking switch body inhibits movement of a transmission shift lever from a parked position to a drive position when the parking switch body is in the parking brake engaged position for requiring manual movement of the parking switch body to the parking brake disengaged position before the transmission shift lever is moveable to the drive position.

According to a further aspect, a parking switch method for a vehicle includes providing a parking switch that is slidably moveable between a parking brake engaged position and a parking brake disengaged position. The parking switch is arranged to block a transmission operating mode selector from moving to a drive position when the parking switch is in the parking brake engaged position. The method further includes sliding the parking switch to the parking brake engaged position when the transmission operating mode selector is in the parked position to block the transmission operating mode selector.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
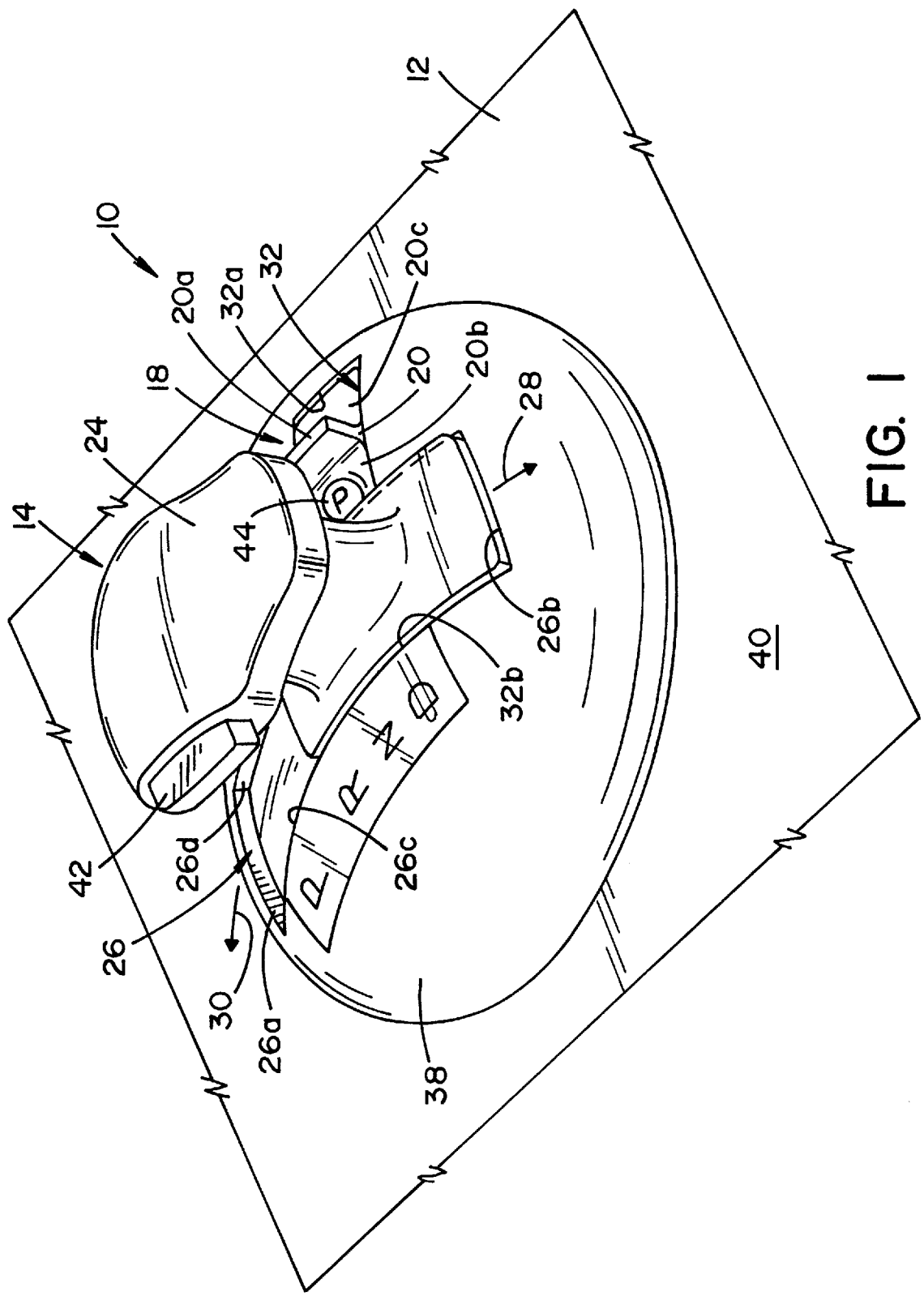
FIG. 1 is a perspective view of a sliding parking switch assembly according to an exemplary embodiment including a transmission operating mode selector shown in a drive position and a parking switch shown in a parking brake disengaged position.

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

FIGS. 1-4 illustrate a sliding parking switch assembly 10 for a vehicle 12. The sliding parking switch assembly 10 includes a transmission operating mode selector 14 for an automatic transmission 16 (FIG. 5) moveable between a park position shown in FIGS. 3 and 4 and a drive position shown in FIGS. 1 and 2. The sliding parking switch assembly 10 additionally includes a vehicle parking switch 18 for a brake 22 (FIG. 5) slidably moveable between a parking brake engaged position shown in FIG. 4 and a parking brake disengaged position shown in FIGS. 1-3. As will be described in more detail below, the parking switch 18 blocks movement of the transmission operating mode selector 14 from the park position to the drive position when the parking switch 18 is in the parking brake engaged position (see FIG. 4).

Figure 5:
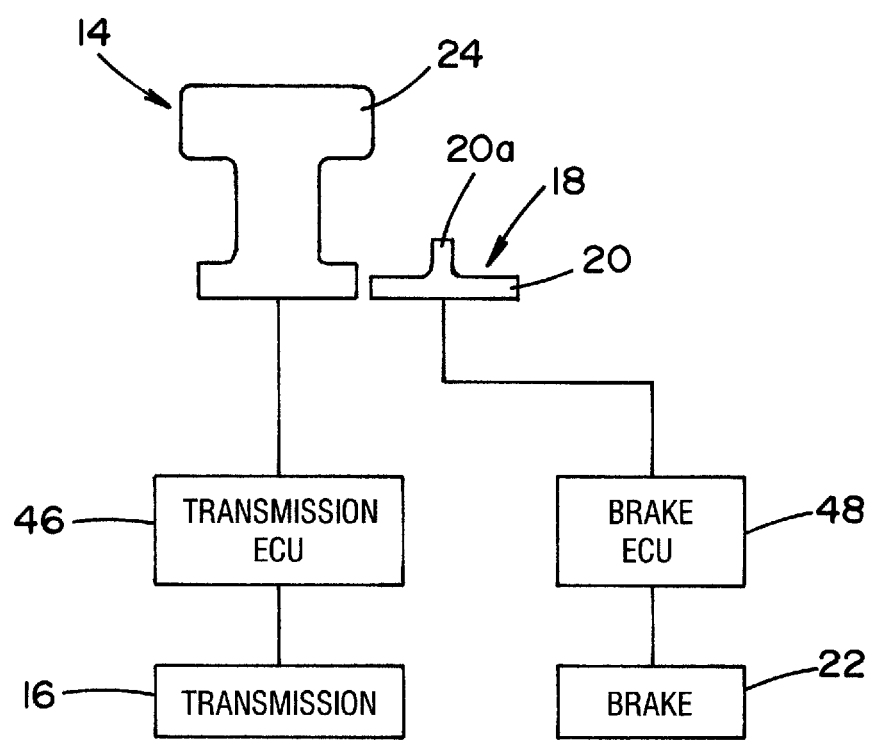
FIG. 5 is a schematic view showing the transmission operating mode selector and the parking switch connected, respectively, to a transmission electronic control unit and an automatic transmission and to a brake electronic control unit and a brake.

With additional reference to FIG. 5, the transmission operating mode selector 14 can function to change the state of the automatic transmission 16. In one embodiment, the position of the transmission operating mode selector 14 is used to control the transmission 16 by a transmission electronic control unit (ECU) 46. Similarly, the vehicle parking switch 18 can be connected to the brake 22 through a brake electronic control unit (ECU) 48. As schematically shown, the ECUs 46, 48 are depicted individually; however, it is to be appreciated that the ECUs 46, 48 could alternatively be combined in a single ECU. In addition or in the alternative, one or both of the ECUs 46, 48 can be combined with another ECU on the vehicle 12, such as the main vehicle or engine ECU (not shown).

Figure 2:
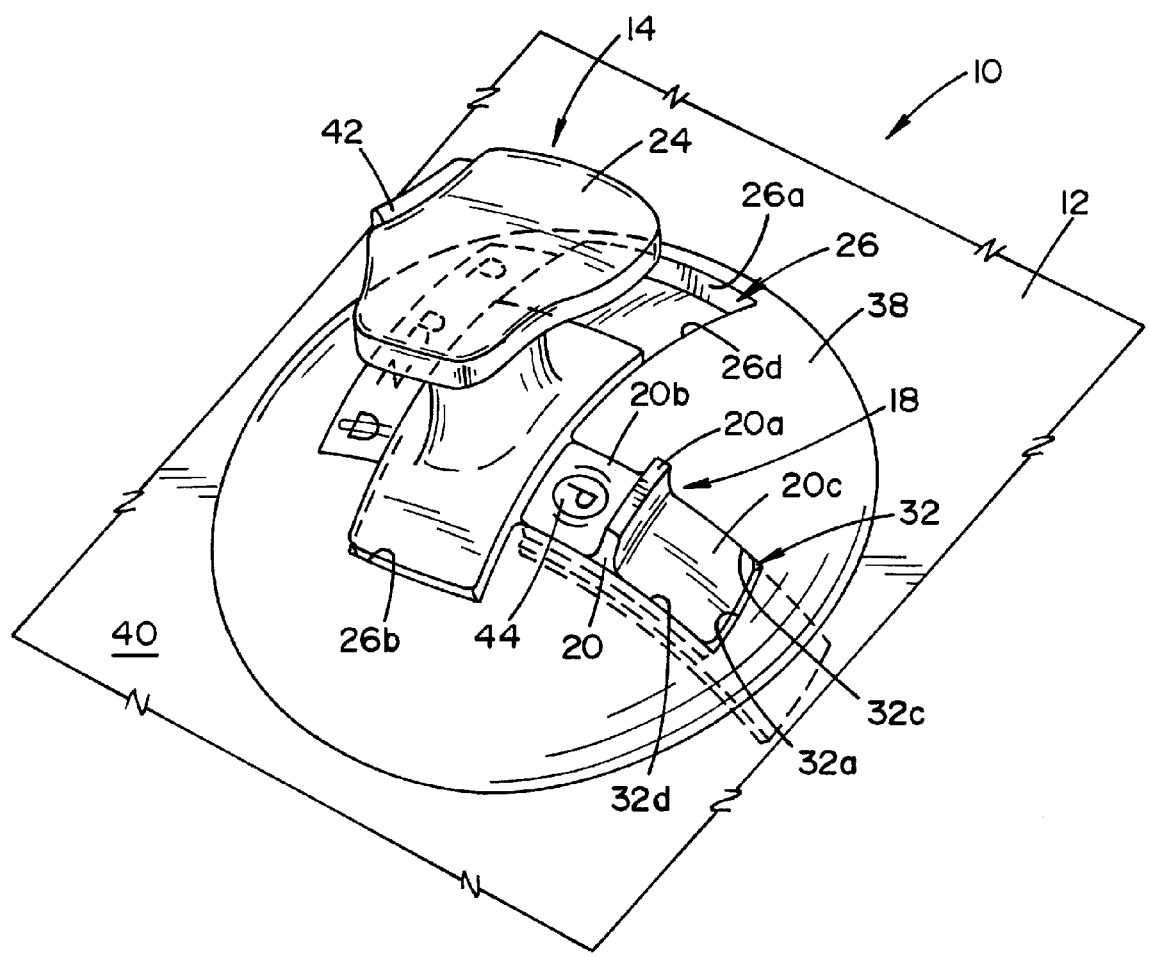
FIG. 2 is another perspective view of the sliding parking switch assembly shown from an opposite side as FIG. 1.
Figure 3:
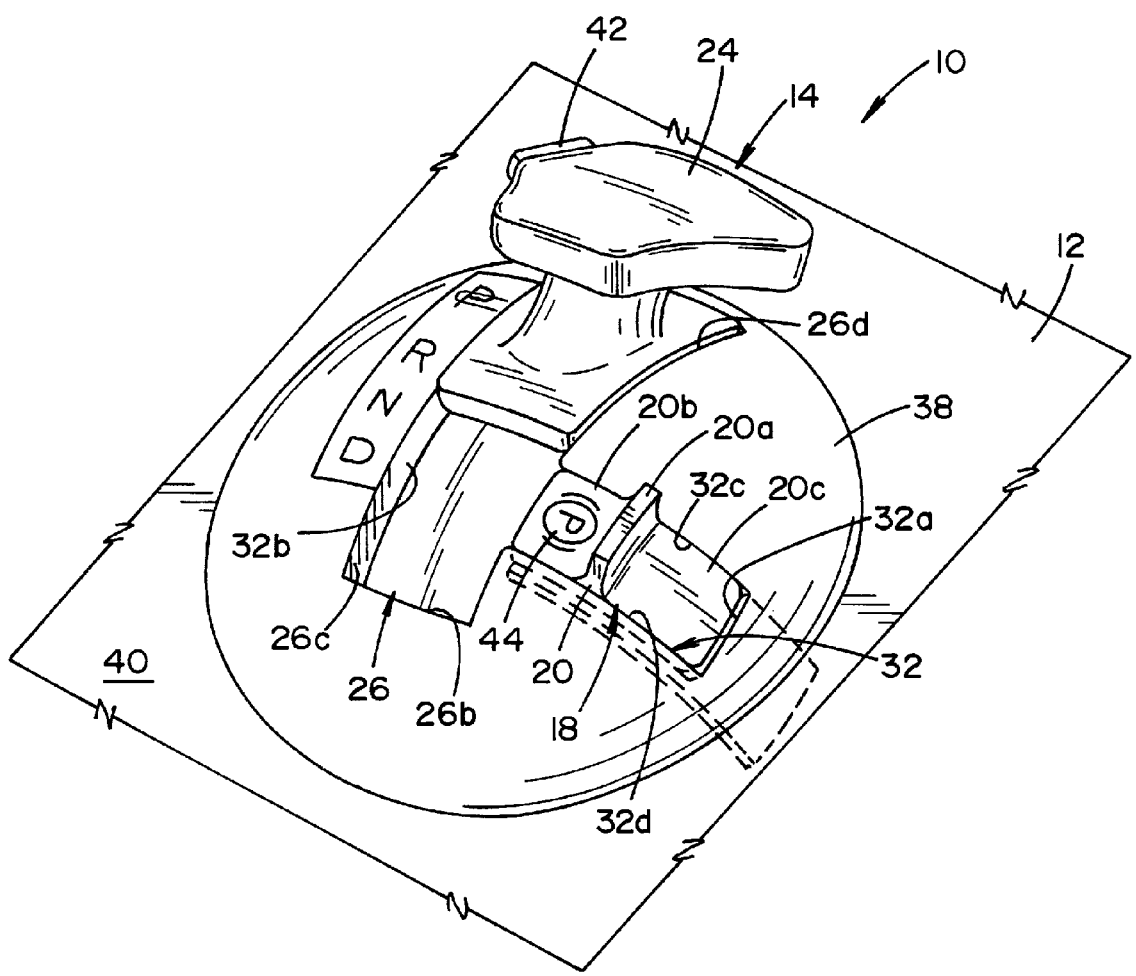
FIG. 3 is a perspective view of the sliding parking switch assembly similar to FIG. 2 but showing the transmission operating mode selector in a parked position.
Figure 4:
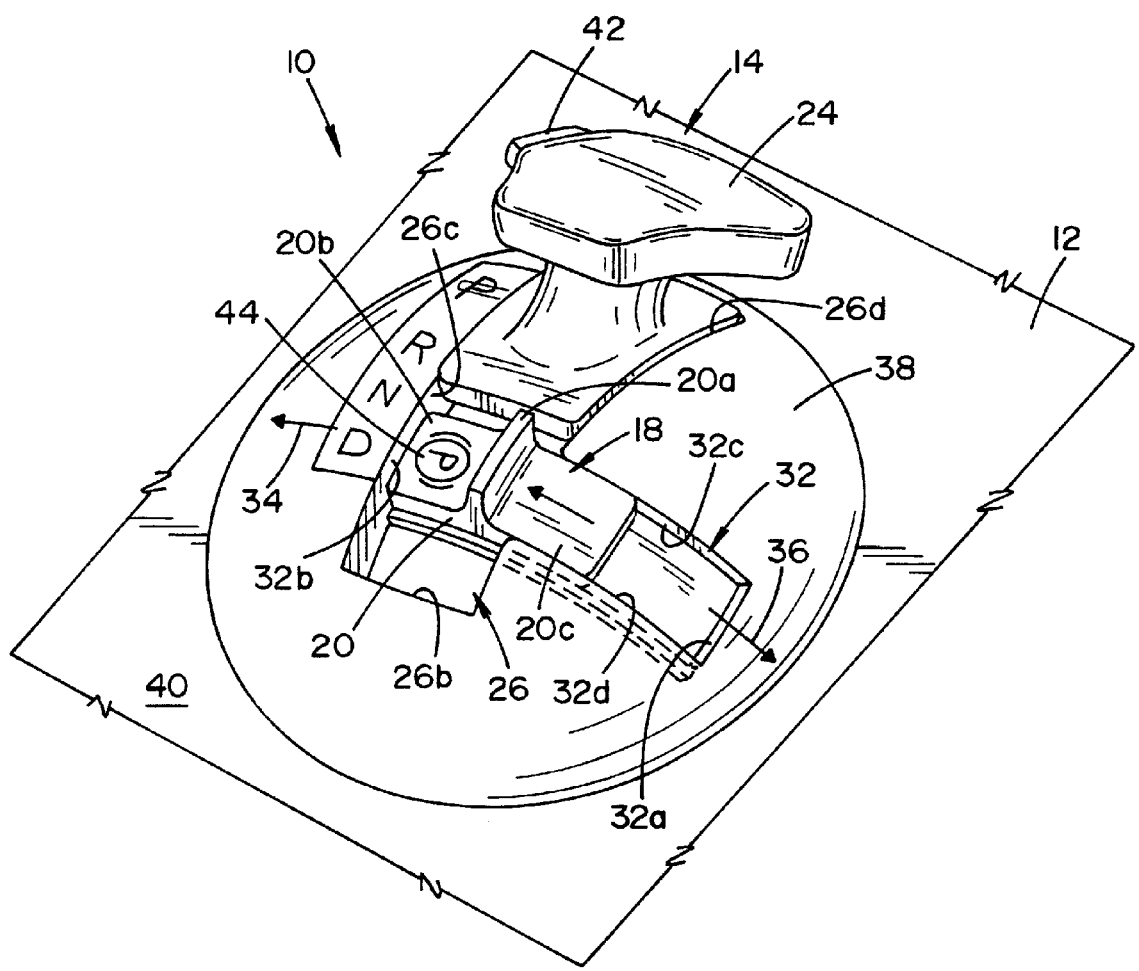
FIG. 4 is another perspective view of the sliding parking switch assembly similar to FIG. 2 but showing the transmission operating mode selector in the park position and the parking switch slidably moved to the parking brake engaged position.

The parking switch 18 of the illustrated embodiment has a parking switch body 20 that is slidably moveable between the parking brake engaged position shown in FIG. 4 wherein a parking brake 22 (FIG. 5) is in an engaged state and a parking brake disengaged position shown in FIGS. 1-3 wherein the parking brake 22 is in a disengaged state. The parking switch 18, particularly the parking switch body 20, inhibits movement of the transmission operating mode selector 14 from the parked position to the drive position when the parking switch body 20 is in the parking brake engaged position shown in FIG. 4 for requiring manual movement of the parking switch body 20 to the parking brake disengaged position before the transmission operating mode selector 14 is moveable to the drive position.

The transmission operating mode selector 14, also referred to herein as a transmission shift lever, includes a selector body 24 that is slidably moveable between the park position and the drive position. The transmission operating mode selector 14, particularly the selector body 24, is also movable to intermittent positions, such as a neutral position and a reverse position in the illustrated embodiment. Additional drive positions (e.g., a low or D1 position) can also be provided. The transmission operating mode selector 14 can include a button actuator 42. When included, the button actuator 42 can be depressed to enable the transmission operating mode selector 14 to move from at least the park position to the drive position. This prevents inadvertent movement or shifting of the transmission operating mode selector 14 into the drive position (or the reverse or neutral positions) independent and irrespective of the position of the parking switch 18.

The transmission operating mode selector 14, and particularly the selector body 24, is particularly moveable in a selector travel direction along a track 26. In particular, the transmission operating mode selector 14 is moveable along the track 26 that defines or limits the selector travel direction (shown by arrows 28 and 30) along which the transmission operating mode selector 14 is moveable between the park position and the drive position. Similarly, the parking switch 18, and particularly the parking switch body 20, is moveable within a parking switch track 32 between the parking brake engaged position and the parking brake disengaged position. The parking switch track 32 defines or limits movement of the parking switch 18 to a parking switch travel direction illustrated by arrows 34 and 36 in FIG. 4. In one embodiment, as shown, the parking switch 18 is arranged such that slidable movement thereof occurs laterally across the vehicle 12. Thus, the parking switch direction of travel generally occurs laterally across the vehicle 12.

As shown, the transmission selector travel direction is generally perpendicularly oriented relative to the parking switch travel direction. As arranged in the illustrated embodiment, the parking switch 18 is only slidably moveable from the parking state disengaged position shown in FIGS. 1-3 to the parking state engaged position shown in FIG. 4 when the transmission operating mode selector 14 is in the park position shown in FIGS. 3 and 4. The transmission operating mode selector 14 is only slidably moveable from the park position shown in FIGS. 1, 3, and 4 to the drive position shown in FIGS. 1 and 2 when the parking switch 18 is in the parking brake disengaged position shown in FIGS. 1-3. Accordingly, the parking switch 18 is moveable in the parking switch direction of travel defined by the parking switch track 32 and the parking switch direction of travel is oriented in a generally perpendicular relation relative to the selector direction of travel for the transmission operating mode selector 14.

In the illustrated embodiment, the tracks 26, 32 are defined in a raised globe portion 38 protruding from a vehicle surface 40, which could be defined in a center console area of the vehicle or elsewhere in the vehicle 12. For example, the transmission operating mode selector 14 and the parking switch 18 could be disposed on at least one of a steering column of the vehicle, a dashboard portion of the vehicle, etc.

The transmission selector travel direction of the illustrated embodiment is specifically along an arc defined by the track 26 in the raised globe portion 38 and likewise the parking switch travel direction is defined along an arc defined by the parking switch track 32 in the raised globe portion or element 38. The two arcs are perpendicular or orthogonally oriented relative to one another.

The selector track 26 has a forward wall 26a that limits movement of the transmission operating mode selector 14 beyond the park position and a rearward wall 26b that limits movement of the transmission operating mode selector 14 beyond the drive position. As best shown in FIG. 4, the parking switch 18 is moveable into the transmission operating mode selector track 26 to a location interposed or between the forward wall 26a and the rearward wall 26b when blocking movement in the transmission operating mode selector 14 from the park position to the drive position. The transmission track 26 is also defined by lateral walls 26c, 26d. Likewise, the parking switch track 32 has a forward wall 32a (forward relative to the parking switch direction of travel) that limits movement of the parking switch 18 beyond the parking brake disengaged position and a rearward wall 32b that limits movement of the parking switch 18 beyond the parking brake engaged position. The parking switch track 32 also includes lateral walls 32c, 32d. In the illustrated embodiment, the rearward wall 32b of the parking switch track 32 is a portion of a lateral wall 26c of the transmission selector track 26.

In particular, the transmission operating mode selector 14 is moveable within the transmission selector track 26 and the transmission operating mode selector 14, and particularly the selector body 24 thereof, protrudes outwardly relative to the walls 26a, 26b, 26c, 26d defining the selector track 26. Similarly, the parking switch 18 is moveable within the parking switch track 32 and the parking switch 18, and particularly the parking switch body 20 thereof, protrudes outwardly relative to the walls 32a, 32b, 32c, 32d defining the parking switch track 32. In the illustrated embodiment, the transmission operating mode selector 14 protrudes outwardly relative to the walls 26a, 26b, 26c, 26d defining the transmission selector track, and relative to the walls 32a, 32b, 32c, 32d of the parking switch track, a greater extent than the parking switch 20 protrudes outwardly relative to the walls 32a, 32b, 32c, 32d defining the parking switch track 32.

In the illustrated embodiment, the parking switch body 20 is generally elongated in the parking switch direction of travel and includes a protruding portion 20a extending upward therefrom at an approximate center location of the parking switch body 20 for facilitating manipulation of the parking switch body 20. In the illustrated embodiment, the parking switch 18, and particularly the parking switch body 20, includes marking indicia 44 thereon indicating a function of the parking switch 18. The marking indicia 44 can be located on the elongated body 20 on one side (e.g., side 20b) of the protruding portion 20a. In particular, the marking indicia 44 can be disposed on the parking switch body 20 on the side 20b thereof that is more adjacent the transmission operating mode selector 14 than an opposite side 20c.

By the arrangement of the parking switch 18 relative to the transmission operating mode selector 14, including the arrangement of the transmission selector track 26 and the parking switch track 32, the marking indicia 44 can be substantially or at least partially hidden from view (e.g., of the driver) when the transmission operating mode selector 14 is in the drive position (shown in FIG. 1) and the parking switch 18 is in the parking brake disengaged position. In the illustrated embodiment, the marking indicia 44 is at least partially hidden when the parking switch body 20 is in the parking brake disengaged position and the transmission operating mode selector 14 is in the drive position, as shown in FIG. 1.

Figure 6:
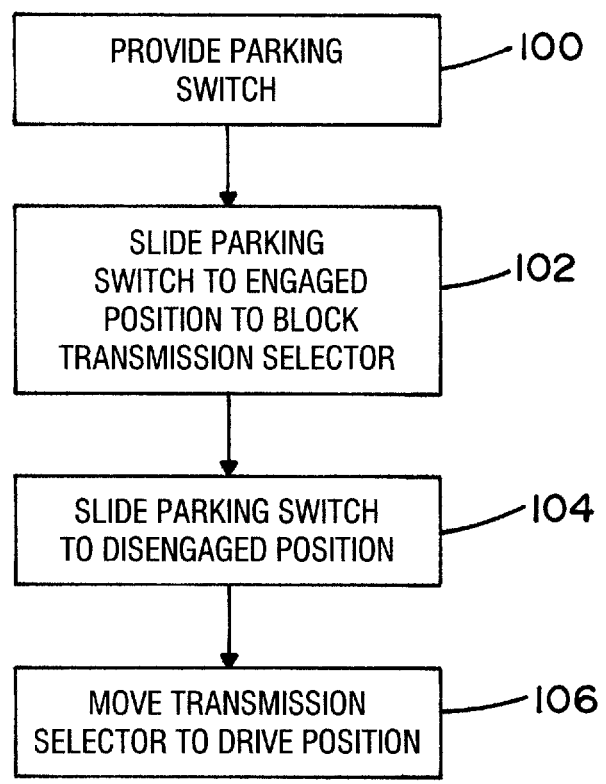
FIG. 6 is a schematic flow diagram illustrating a parking switch method according to an exemplary embodiment.

With reference now to FIG. 6, a parking switch method for a vehicle will be described. In particular, the parking switch method of FIG. 6 will be described in association with a sliding parking switch assembly 10 shown in FIGS. 1-4 and described hereinabove, though this is not required. As shown in FIG. 6, the parking switch 18 that is slidably moveable between the parking brake engaged position and the parking brake disengaged position is provided at 100. As already discussed herein, the parking switch 18 is arranged to block the transmission operating mode selector 14 from moving to the drive position when the parking switch 18 is in the parking brake engaged position. As shown at 102, the parking switch 18 can be moved or slid to the parking brake engaged position when the transmission operating mode selector 14 is in the park position to block the transmission operating mode selector 14. In particular, the parking switch 18 can block movement of the transmission operating mode selector 14 from the park position to the drive position.

As shown at 104, the parking switch 18 can be slid or moved to the parking brake disengaged position to unblock the transmission operating mode selector 14 and, as shown at 106, the transmission operating mode selector 14 can be then moved to the drive position after sliding the parking switch 18 to the parking brake disengaged position. Providing the parking switch in 100 can include, as already described herein, arranging the parking switch 18 relative to the transmission operating mode selector 14 such that the parking switch 18 is at least partially obstructive from view when in the parking brake disengaged position and the transmission operating mode selector 14 is in the drive position.

Advantageously, the sliding parking switch assembly 14 removes the need for a parking brake lever. Additionally, the sliding parking switch assembly 14 provides a relatively simple mechanism for preventing the vehicle 12 from being driven without first releasing the parking brake 22 via the parking brake switch 18. As a result of this arrangement, no illuminated indicator is necessary to indicate that the parking brake is on and the vehicle 12 cannot be driven with the parking brake on (i.e., the vehicle 12 cannot be driven until the parking brake switch 18 is moved to the parking brake disengaged position).

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

The invention claimed is:

1. A sliding parking switch assembly for a vehicle, comprising:

a transmission operating mode selector for an automatic transmission movable between a park position and a drive position; and a parking switch body disposed at or adjacent a vehicle surface from which the transmission operating mode selector protrudes and slidably movable between a parking brake engaged position and a parking brake disengaged position, the parking switch body blocking movement of the transmission operating mode selector from the park position to the drive position when the parking switch body is in the parking brake engaged position.

2. The sliding parking switch assembly of claim 1 wherein the transmission operating mode selector is movable along a selector track between the park position and the drive position.

3. The sliding parking switch assembly of claim 2 wherein the parking switch body is movable along a parking switch track between the parking brake engaged position and the parking brake disengaged position, the selector track defining a selector direction of travel and the parking switch track defining a parking switch direction of travel that is perpendicularly oriented relative to the selector direction of travel.

4. The sliding parking switch assembly of claim 3 wherein the parking switch body is only slidably moveable from the parking state disengaged position to the parking state engaged position when the transmission operating mode selector is in the park position, the transmission operating mode selector is only slidably moveable from the park position to the drive position when the parking switch body is in the parking brake disengaged position.

5. The sliding parking switch assembly of claim 1 wherein the transmission operating mode selector is movable within a transmission operating mode selector track having a forward wall that limits movement of the transmission operating mode selector beyond the park position and a rearward wall that limits movement of the transmission operating mode selector beyond the drive position, and wherein the parking switch body is moveable into the transmission operating mode selector track between the forward wall and the rearward wall when blocking movement of the transmission operating mode selector from the park position to the drive position.

6. The sliding parking switch assembly of claim 5 wherein the parking switch body is movable within a parking switch track having a forward wall that limits movement of the parking switch body beyond the parking brake disengaged position and a rearward wall that limits movement of the parking switch body beyond the parking brake engaged position, the rearward wall of the parking switch track also defining a lateral wall of the transmission selector track.

7. The sliding parking switch assembly of claim 1 wherein the transmission operating mode selector is moveable within a transmission operating mode selector track and the transmission operating mode selector protrudes outwardly relative to walls defining the transmission operating mode selector track, and wherein the parking switch body is moveable within a parking switch track and the parking switch body protrudes outwardly relative to the walls defining the parking switch track, the transmission operating mode selector protruding outwardly relative to the walls defining the transmission selector track a greater extent than the parking switch body protrudes outwardly relative to the walls defining the parking switch track.

8. The sliding parking switch assembly of claim 7 wherein the parking switch body is arranged relative to the transmission operating mode selector such that the parking switch body is at least partially obstructed from view when the transmission operating mode selector is in the drive position and the parking switch body is in the parking brake engaged position.

9. The sliding parking switch assembly of claim 8 wherein the parking switch body includes marking indicia thereon and the marking indicia is hidden from view when the transmission operating mode selector is in the drive position and the parking switch body is in the parking brake disengaged position.

10. The sliding parking switch assembly of claim 1 wherein the transmission operating mode selector and the parking switch body are disposed on at least one of a steering column, a dashboard portion or a center console of a vehicle.

11. The sliding parking switch assembly of claim 1 wherein the parking switch body is arranged such that slidable movement thereof occurs laterally across the vehicle.

12. The sliding parking switch assembly of claim 11 wherein the parking switch body has an elongated body with a protrusion portion extending upward therefrom at or near a center location of the elongated body and spaced apart from longitudinal ends of the elongated body.

13. The sliding parking switch assembly of claim 12 wherein the parking switch body includes marking indicia thereon indicating a function of the parking switch body, the marking indicia located on the elongated body on one side of the protruding portion.

14. A vehicle parking switch, comprising:
a parking switch body slidably movable between a parking brake engaged position wherein a parking brake is in an engaged state and a parking brake disengaged position wherein the parking brake is in a disengaged state, the parking switch body inhibiting movement of a transmission shift lever from a park position to a drive position when the parking switch body is in the parking brake engaged position for requiring manual movement of the parking switch body to the parking brake disengaged position before the transmission shift lever is movable to the drive position.

15. The vehicle parking switch of claim 14 wherein the parking switch body is movable in a parking switch direction of travel defined by a parking switch track, the parking switch direction of travel oriented in a perpendicular relation relative to a direction of travel of the transmission shift lever.

16. The vehicle parking switch of claim 14 wherein the parking switch body is elongated in a direction of travel of the parking switch body and includes a protruding portion extending upward for facilitating manipulation of the parking switch body.

17. The vehicle parking switch of claim 14 further including marking indicia disposed on the parking switch body on a side thereof that is more adjacent the transmission shift lever, the marking indicia at least partially hidden when the parking switch body is in the parking brake disengaged position and the transmission shift lever is in the drive position.

18. A parking switch method for a vehicle, comprising:
providing a parking switch that is slidably movable between a parking brake engaged position wherein a parking brake of the vehicle is in an engaged state and a parking brake disengaged position wherein the parking brake is in a disengaged state, the parking switch arranged to block a transmission operating mode selector from moving to a drive position when the parking switch is in the parking brake engaged position; and
sliding the parking switch to the parking brake engaged position when the transmission operating mode selector is in the park position to block the transmission operating mode selector.

19. The parking switch method of claim 18 further including:
sliding the parking switch to the parking brake disengaged position to place the parking brake in the disengaged state and to unblock the transmission operating mode selector; and
moving the transmission operating mode selector to the drive position after sliding the parking switch to the parking brake disengaged position.

20. The parking switch method of claim 18 wherein providing the parking switch includes arranging the parking switch relative to the transmission operating mode selector such that the parking switch is at least partially obstructed from view when in the parking brake disengaged position and the transmission operating mode selector is in the drive position.

21. The sliding parking switch assembly of claim 1 further including a button actuator disposed on the transmission shift selector adjacent a distal end hereof for preventing inadvertent shifting of the transmission shift selector.

22. The vehicle parking switch of claim 15 wherein the parking switch track is defined in a vehicle surface from which the transmission sift lever protrudes.

* * * * *